(No Model.)
E. CASE.
CULTIVATOR.
No. 270,887. Patented Jan. 23, 1883.
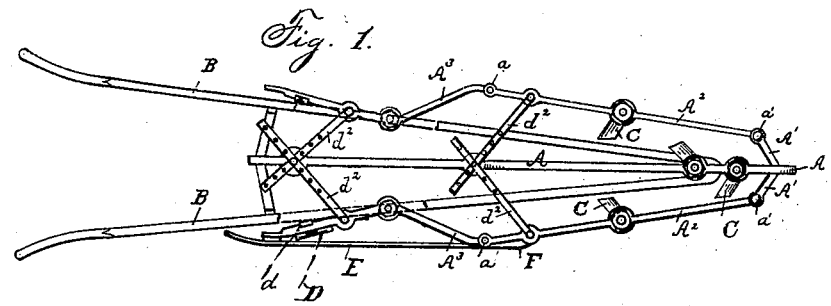
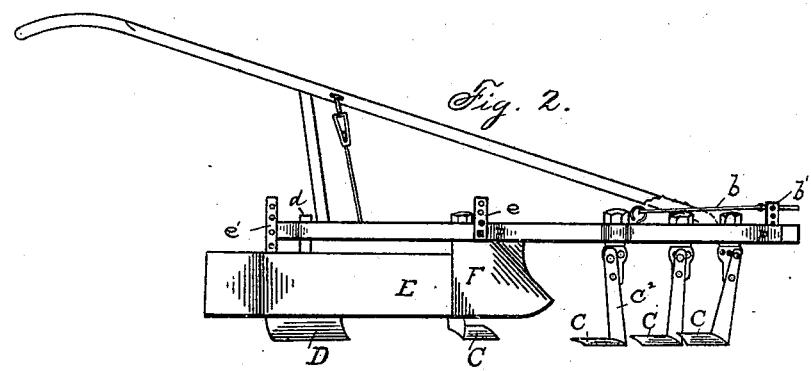
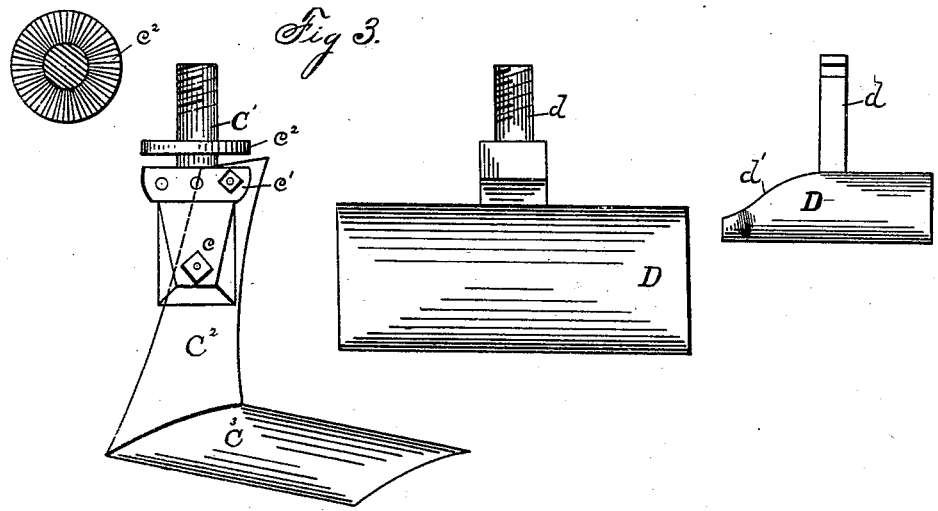
WITNESSES
Samuel E. Thomas.
J. Edward Warren.
INVENTOR
Edwin Case
By W. W. Leggett
Attorney

UNITED STATES PATENT OFFICE.

EDWIN CASE, OF EAST TOLEDO, OHIO.

CULTIVATOR.

SPECIFICATION forming part of Letters Patent No. 270,887, dated January 23, 1883.

Application filed April 20, 1882. (No model.)

*To all whom it may concern:*

Be it known that I, EDWIN CASE, of East Toledo, county of Lucas, State of Ohio, have invented a new and useful Improvement in Cultivators; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claims.

In the drawings, Figure 1 is a plan view of an apparatus embodying my invention. Fig. 2 is a side elevation. Fig. 3 represents separate views of the teeth.

It is the object of my invention to provide an efficient, simple, and durable cultivator adapted for either field or garden use, and which may be readily adjusted and adapted to the cultivation of various kinds of plants, and used as either a walking or sulky cultivator, as desired.

In carrying out my invention, A is the center beam of the frame. A' represents short arms reaching right and left, secured rigidly to the front end of the center beam. $A^2$ and $A^3$ represent the right and left wings of the frame, said parts hinged or pivoted to each other, as shown at $a$, and to the front arms, A', as shown at $a'$. I prefer that these parts should be constructed in the shape shown in Fig. 1, $A^2$ being made straight and $A^3$ in the form of an elbow.

B are the handles, adjusted to the frame in any proper manner, and suitably braced. $a^2$ represents extension-braces secured to the center beam and wings, and provided with means of adjustment whereby the different portions of the wings can be secured nearer to or removed farther from the center beam, as may be desired, and the parts $A^3$ carried straight with the row.

$b$ is a draft-rod or any suitable means for attachment to the whiffletree. I prefer that said rod shall be attached to the center beam back from its forward end sufficiently to prevent the draft from lifting the front hoes and to make the cultivator run smooth and steady.

At the forward end of the center beam is a clevis-shaped standard, $b'$, for regulating the position of the draft-rod. Said standard is constructed with an adjustable bolt, whereby the end of the draft-rod may be raised or lowered.

C represents hoes of any desired number, preferably six.

C' is the upper shank of the hoe, adapted at its upper end to pass through the frame and to be secured thereto by a nut at the top. Said shank is bolted to the lower shank of the hoe, $C^2$, as shown at $c$ and $c'$. At $c'$ the shank is preferably broadened and provided with a series of bolt-sockets, whereby the angle of the hoe-point and cutting-edge may be adjusted as desired.

$c^2$ is an annular shoulder, having its upper surface preferably serrated or roughened, so that it will interlock with the under surface of the frame and prevent the shank from turning.

$C^3$ is the blade of the hoe, constructed of any desired width and length, and preferably concavo-convex, as shown in Fig. 3. These hoes are constructed to cut either right or left from the shank, as required. By loosening the nut at the top of shank C' the hoe can be set at any desired angle, and by varying the position of the bolt in the series of bolt-sockets $c'$ the blade of the hoe may be tilted to cut to the required depth.

D indicates the hillers, which may be made of various sizes and shapes to meet the requirements of different kinds of work. I prefer that they should be made concave in front, and adjustably attached by a shank, $d$, to the middle or rear ends of the wings $A^3$, and stand in an oblique position, so as to throw the earth about and between the plants. I prefer that small hillers, which are intended for light work, shall be cut away obliquely on their rear upper edges, as shown at $d'$, so that the surplus earth can pass over them easily, and I also prefer that the rear ends of the hillers shall be bent inward toward the center beam.

E is a fender adjustably secured by shanks $e$ and $e'$ to the front and rear ends of one or both of the wings $A^3$, as may be desired, as shown in Fig. 1. Said fender is preferably slanted upward and rearward on the rear portion of its lower edge, and bent inward, so that it will level down the earth which passes over the hiller. The fender is adjustable vertically to regulate the quantity of earth thrown under it about the plants by the hiller.

F is a top-lifter secured, when required, at its rear end to the shank $e$ upon the front end of the fender. It is preferably constructed, as shown in Fig. 4. with a curved projecting point rising to the rear and adapted to lift up the drooping tops of plants out of the way of the hoes and hillers.

The wings may be expanded or contracted, as desired, and the hoes, hillers, and fenders may be adjusted to any desired relative positions.

In cultivating small or tender plants the hillers may be dispensed with and the fenders adjusted close to or slightly into the ground, so as to thoroughly protect the plants, and yet permit the ground to be well hoed close to them between the rows; or the fenders may also be dispensed with.

In order that the frame may be light and strong, I prefer to make its parts of malleable iron. The implement as a whole is so perfectly adjustable that it can be arranged to cultivate the tenderest garden-vegetables or for the heaviest field-work.

In case it is desired to use the main features of this implement as a sulky-cultivator, the center beam, A, is omitted, and the arms A' are somewhat extended to carry the hoes, which are attached to said beam. The wings $A^2$ and $A^3$ may be reversed, so as to arrange the parts to operate on opposite sides of a single row of plants, the fenders facing each other and the hillers throwing the earth inwardly under them to the plants. The implement as thus varied may be secured to a frame mounted on wheels in any convenient manner.

What I claim is—

1. The combination, with the hoes C, of the hillers arranged directly in rear of the hoes, and the fenders E, having their front portions in a plane outside the said hoes, substantially as described.

2. In a cultivator, the combination of the hoes, the top-lifter F, the fender E, and the hiller D, all relatively arranged to operate as set forth.

3. In a cultivator, the combination, with the forward adjustable wings, $A^2$, carrying hoes, of the rear adjustable wings, $A^3$, carrying fenders and hillers or either, substantially as described.

In testimony whereof I sign this specification in the presence of two witnesses.

EDWIN CASE.

Witnesses:
J. EDWARD WARREN,
SAMUEL E. THOMAS.